(12) United States Patent
Berka et al.

(10) Patent No.: US 10,495,333 B2
(45) Date of Patent: Dec. 3, 2019

(54) PROVIDING DEMAND RESPONSE

(71) Applicant: Honeywell International Inc., Morris Plains, NJ (US)

(72) Inventors: Jan Berka, Prague (CZ); Ondrej Holub, Prague (CZ); Richard Finger, Olomouc (CZ); Petr Endel, Prague (CZ)

(73) Assignee: Honeywell International Inc., Morris Plains, NJ (US)

( * ) Notice: Subject to any disclaimer, the term of this patent is extended or adjusted under 35 U.S.C. 154(b) by 310 days.

(21) Appl. No.: 15/442,093

(22) Filed: Feb. 24, 2017

(65) Prior Publication Data
US 2018/0245810 A1    Aug. 30, 2018

(51) Int. Cl.
*F24F 11/30* (2018.01)
*F24F 11/62* (2018.01)
(Continued)

(52) U.S. Cl.
CPC .............. *F24F 11/30* (2018.01); *F24F 11/62* (2018.01); *F24F 11/70* (2018.01); *G05B 19/042* (2013.01);
(Continued)

(58) Field of Classification Search
CPC ............ G05B 15/02; G05B 2219/2614; G05B 2219/2639; G05B 2219/2642; G05D 23/1923
(Continued)

(56) References Cited

U.S. PATENT DOCUMENTS

| 5,415,346 A | 5/1995 | Bishop |
|---|---|---|
| 6,402,043 B1 | 6/2002 | Cockerill |

(Continued)

FOREIGN PATENT DOCUMENTS

| CN | 105378589 A | 3/2016 |
|---|---|---|
| WO | 2015066649 A1 | 5/2015 |

OTHER PUBLICATIONS

Search Report and Written Opinion from related International PCT Application No. PCT/US2018/019503, dated Jun. 15, 2018 (11 pages).

(Continued)

*Primary Examiner* — Michael J Brown

(57) ABSTRACT

Devices, systems, and methods for providing demand response are described herein. One device includes instructions executable to receive thermostat data associated with an operating thermostat of a heating, ventilation, and air conditioning (HVAC) system in a structure over a period of time, determine a first portion of the thermostat data corresponding to steady-state operation periods of the thermostat, determine a second portion of the thermostat data corresponding to operation periods of the thermostat that are responding to temperature setpoint changes, determine a third portion of the thermostat data corresponding to operation periods of the thermostat that are transitions between the steady-state operation periods and the operation periods that are responding to temperature setpoint changes, and create a steady-state model of the thermostat based on the first portion of the thermostat data, a setpoint-change model of the thermostat based on the second portion of the thermostat data, and a transition model of the thermostat based on the third portion of the thermostat data.

18 Claims, 4 Drawing Sheets

(51) Int. Cl.
*F24F 11/70* (2018.01)
*G05B 19/04* (2006.01)
*G05D 23/19* (2006.01)
*G05B 19/042* (2006.01)
*F24F 11/46* (2018.01)
*F24F 11/65* (2018.01)
*G05B 15/02* (2006.01)
*F24F 140/50* (2018.01)
*F24F 110/10* (2018.01)
*F24F 140/60* (2018.01)

(52) U.S. Cl.
CPC .......... *G05D 23/1917* (2013.01); *F24F 11/46* (2018.01); *F24F 11/65* (2018.01); *F24F 2110/10* (2018.01); *F24F 2140/50* (2018.01); *F24F 2140/60* (2018.01); *G05B 2219/2614* (2013.01); *G05B 2219/2639* (2013.01)

(58) Field of Classification Search
USPC .................................................. 700/286, 297
See application file for complete search history.

(56) References Cited

U.S. PATENT DOCUMENTS

| | | | |
|---|---|---|---|
| 8,140,193 B2 | 3/2012 | Lee | |
| 8,352,094 B2 | 1/2013 | Johnson et al. | |
| 8,560,127 B2 | 10/2013 | Leen et al. | |
| 8,862,415 B1 | 10/2014 | Adams | |
| 10,204,182 B2* | 2/2019 | Parthasarathy | G06F 17/5004 |
| 2002/0116282 A1 | 8/2002 | Martin et al. | |
| 2009/0187499 A1 | 7/2009 | Mulder et al. | |
| 2011/0258018 A1 | 10/2011 | Tyagi et al. | |
| 2012/0273581 A1 | 11/2012 | Kolk et al. | |
| 2013/0080210 A1 | 3/2013 | Vogel et al. | |
| 2014/0277795 A1* | 9/2014 | Matsuoka | G06Q 30/0202 700/291 |
| 2014/0324240 A1* | 10/2014 | Thottan | G01D 4/00 700/291 |
| 2014/0343983 A1 | 11/2014 | Narayan et al. | |
| 2015/0170171 A1 | 6/2015 | McCurnin et al. | |
| 2015/0192911 A1 | 7/2015 | Sloop et al. | |
| 2015/0248118 A1 | 9/2015 | Li et al. | |
| 2016/0077538 A1 | 5/2016 | Berka et al. | |

OTHER PUBLICATIONS

Roth, et al, "A Data-Driven Framework for Comparing Residential Thermostat Energy Performance", https://cdn2.hubspot.net/hub/55819/file-2307772654-pdf/docs/fhcse_-_nest_-_framework_for_comparing_thermostat_energy_performance_-_final.pdf, Jul. 2014, 38 pp.

* cited by examiner

PROVIDING DEMAND RESPONSE

TECHNICAL FIELD

The present disclosure relates to devices, methods, and systems for providing demand response.

BACKGROUND

Demand response can include voluntary changes in electricity usage of an electric utility customer (e.g., residential and/or commercial structure) to better match the demand for power with the supply. Demand response can allow for the reduction of load on electrical grids based on signals that are sent to structures. For example, a demand response request (e.g., signal) sent to a structure by an electricity supplier or other grid management entity (e.g., utility) can result in some number of loads in that facility being shut down and/or running at reduced capacity.

Previous approaches to demand response have shortcomings in a number of respects. In order to effectively manage demand response, utilities may validate impacts of demand response events in terms of overall energy shed. The shed can be calculated as the difference between aggregated load under the demand response signal and a baseline load (e.g., the aggregated load if no demand response signal was sent). Previous approaches to determining the baseline may exhibit high error rates due to their usage of consumption data from non-demand response days, which may experience different weather and/or energy usage than demand response days.

Additionally, previous approaches may not assess which demand response program(s) are appropriate for a given customer. Stated in other terms, previous approaches may not assess which demand response program(s) the utility should offer and/or recommend to the customer because they are likely to bring the most value to the utility.

Additionally, previous approaches may not leverage thermostat data in order to identify customers who may benefit the most from an energy audit. Some previous approaches select candidate customers for an energy audit using information including customer address, name, age, and/or electricity bills, and then, upon approval by the customer, send an auditor to the structure having little or no context as to the reason(s) for the inefficiencies. Increased time spent at the structure translates to increased costs.

DETAILED DESCRIPTION

Figure 1:
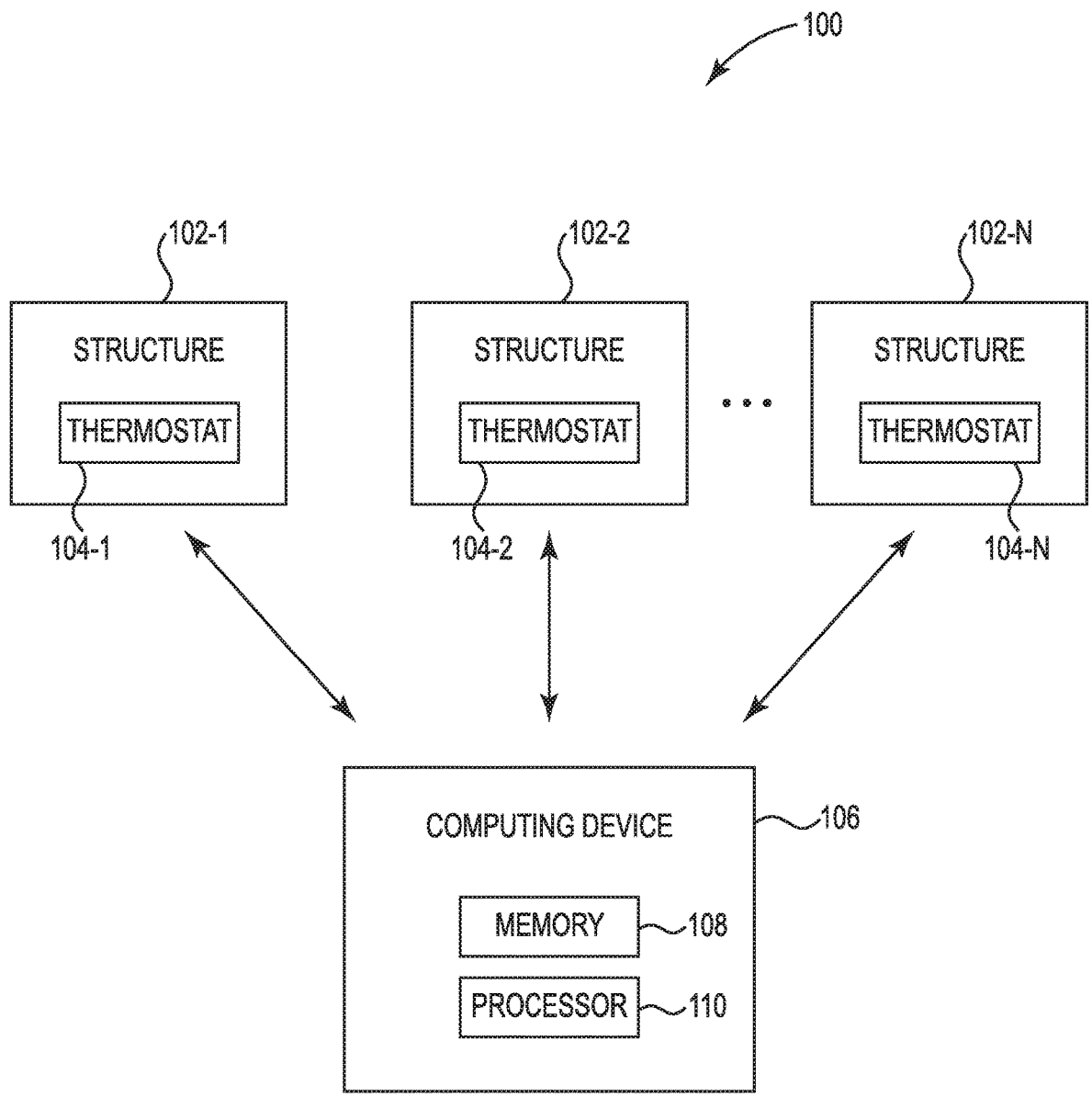
FIG. 1 illustrates a system for providing demand response in accordance with one or more embodiments of the present disclosure.

Devices, methods, and systems for providing demand response are described herein. For example, one or more embodiments include instructions to receive thermostat data associated with an operating thermostat of a heating, ventilation, and air conditioning (HVAC) system in a structure over a period of time, determine a first portion of the thermostat data corresponding to steady-state operation periods of the thermostat, determine a second portion of the thermostat data corresponding to operation periods of the thermostat that are responding to temperature setpoint changes, determine a third portion of the thermostat data corresponding to operation periods of the thermostat that are transitions between the steady-state operation periods and the operation periods that are responding to temperature setpoint changes, and create a steady-state model of the thermostat based on the first portion of the thermostat data, a setpoint-change model of the thermostat based on the second portion of the thermostat data, and a transition model of the thermostat based on the third portion of the thermostat data.

Demand response, as referred to herein, can include voluntary changes in electricity usage by an electric utility customer in response to a request by an electricity supplier or other grid management entity; this request typically occurs when there is heavy demand for electricity on the electrical grid, and is intended to prevent temporary electricity shortfalls. Where the term "customer" is used herein, it is to be understood that such reference denotes a consumer of HVAC services and/or energy. For example, a customer can be a structure, a thermostat associated with that structure, and/or a number of heating, ventilation, and air conditioning (HVAC) system devices of that structure. Additionally, the term customer may refer to a person, such as an inhabitant of the structure and/or a user of the thermostat or devices.

A demand response request is referred to as a demand response event, and can be sent to a customer via email or text message, or via an automated signal, wherein the latter may be referred to as automated demand response (ADR). When a demand response event is sent to a customer, it may be the customer's responsibility to take actions to reduce electrical usage for some period of time specified in the event message—this typically means that some number of electrical loads in one or more customer facilities are shut down and/or run at reduced capacity.

As referred to herein, an event can include a signal and/or a request to reduce load. An event can be a signal in response to which a number of loads are shut down or run at reduced capacity. In some embodiments, events can be sent (e.g., issued) from a utility. In some embodiments, events can be scheduled (e.g., manually scheduled) by customers themselves. It is noted that where the singular "structure" is used herein, such reference can refer to any number of structures, buildings, plants, refineries, sites, etc.

Load, as referred to herein, includes electricity use by one or more devices and/or systems. For example, loads can refer to units and/or systems associated with HVAC, refrigeration, lighting, and/or industrial equipment, among others.

Embodiments of the present disclosure can receive data associated with the operations of thermostats (hereinafter referred to as "thermostat data"). This data can include desired temperatures (e.g., setpoints), measured temperatures, signals from HVAC devices (e.g., fans, compressors, furnaces, etc.), and/or demand response event signals (including start and stop times, event types, user opt-outs from events, event refreshes sent by the utility, etc.).

Additionally, embodiments of the present disclosure can receive contextual information associated with HVAC systems and/or structures. Contextual information, as referred to herein, includes rated power of HVAC devices, structure locations (e.g., zip codes), structure types (e.g., residential, commercial, etc.), ages of HVAC systems, and/or installation dates of HVAC systems, among other information.

Thermostat data and contextual information (cumulatively referred to herein as "received information") can be used for a number of purposes in accordance with embodiments herein. In some embodiments, for instance, customers can be sorted into segments of similar usage behavior. These segments can be used to determine a baseline load for use in determining an overall energy shed. In contrast with previous approaches, embodiments herein can reduce error rates in determining baseline load and thus allow for more accurate determinations of overall energy shed. Accordingly, utilities can better validate the impacts of demand response events.

Additionally, embodiments of the present disclosure can use the received information to create a number of operating models for a given customer. In some embodiments, such models may be used to assess which demand response program(s) are appropriate for a given customer and/or are likely to bring the most value to the utility.

Further, models in accordance with the present disclosure can leverage thermostat data in order to identify customers who may benefit the most from an energy audit. For instance, embodiments herein can determine a likely root cause of HVAC inefficiencies, be it air conditioning inadequacy, insulation inadequacy, and/or customer behavior, for instance.

By using information particular to individual customers, embodiments herein can provide a number of aspects of demand response to customers at a cost and efficiency not seen in previous approaches. Moreover, embodiments herein can empower utilities with more reliable information that can allow the improved provision of demand response programs to all their participating customers.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of loads" can refer to one or more loads.

FIG. 1 illustrates a system 100 for providing demand response in accordance with one or more embodiments of the present disclosure. As shown in FIG. 1, the system 100 can include a plurality of structures (e.g., sites) in communication with a computing device. That is, the system 100 can include a structure 102-1, a structure 102-2, and a structure 102-N (cumulatively referred to as "structures 102) in communication with a computing device 106. Each of the structures can include a respective thermostat. The structure 102-1 includes a thermostat 104-1, the structure 102-2 includes a thermostat 104-2, and the structure 102-N includes a thermostat 104-N (cumulatively referred to as "thermostats 104"). It is noted that while one thermostat is shown in each structure, embodiments of the present disclosure are not so limited; structures can include different numbers of thermostats.

The thermostats 104 can be programmable communicating thermostats (PCTs), for instance, which may include a display, a memory, and/or a processor in a manner analogous to the computing device 106 (discussed below). The thermostats 104 can have a wired and/or wireless connection with the computing device 106 allowing communication between the computing device 106 and each of the thermostats 104

The computing device 106 can be, for example, a laptop computer, a desktop computer, or a mobile device (e.g., a mobile phone, a personal digital assistant, etc.), among other types of computing devices. In some embodiments, the computing device 102 can be a demand response automation server (DRAS).

As shown in FIG. 1, computing device 106 includes a memory 108 and a processor 110 coupled to memory 108. Memory 108 can be any type of storage medium that can be accessed by processor 110 to perform various examples of the present disclosure. For example, memory 108 can be a non-transitory computer readable medium having computer readable instructions (e.g., computer program instructions) stored thereon that are executable by processor 110 to provide demand response in accordance with one or more embodiments of the present disclosure.

Memory 108 can be volatile or nonvolatile memory. Memory 108 can also be removable (e.g., portable) memory, or non-removable (e.g., internal) memory. For example, memory 108 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 108 is illustrated as being located in the computing device 106, embodiments of the present disclosure are not so limited. For example, memory 108 can also be located internal to another computing resource (e.g., enabling computer readable instructions to be downloaded over the Internet or another wired or wireless connection). Though not shown in FIG. 1, each of the thermostats 104 can include a memory and a processor configured to execute instructions stored on the memory to provide demand response in accordance with one or more embodiments of the present disclosure. Each of the structures 102 can include HVAC devices. HVAC devices can include fans, compressors, furnaces, and other devices that aid in the provision of comfort in the structure.

The computing device 106 can receive information from each of the structures 102. As previously discussed, the received information can include thermostat data and/or contextual information. Thermostat data can include setpoints, measured temperatures, signals from HVAC devices and/or demand response event signals (including start and stop times, event types, user opt-outs from events, event refreshes sent by the utility, etc.). Thermostat data can include times when the HVAC system is operating (e.g., an "on-time") and times when the HVAC system is not operating (e.g., an "off-time"). For the purposes of illustration, an air conditioning system is discussed herein as an example HVAC device as typical demand response programs involve air conditioning control. It is noted, however, that embodiments of the present disclosure are not intended to be limited to air conditioning systems.

In some embodiments, a DRAS can provide a complete history of thermostat data for one or more customers to be processed (e.g., in a batch). In some embodiments, a DRAS can provide most recent thermostat data updates in order to keep current.

Contextual information can include rated power of HVAC devices, structure locations (e.g., zip codes), structure types (e.g., residential, commercial, etc.), ages of HVAC systems, and/or installation dates of HVAC systems, among other information. In some embodiments, contextual information can be received from an external entity (e.g., an entity other than one of the structures 102).

The computing device 106 can convert thermostat data to energy consumption. In some embodiments, the device rated power can be used. The rated power can be obtained from the device's nameplate(s) logged during installation. In some embodiments, an average (e.g., an estimated average) of air conditioning power can be received from a utility. In some embodiments, consumption data from one or more electricity meters installed in the structures 102 can be used.

As previously discussed, the received information can be used to sort customers into segments of similar usage behavior. These segments can be used to determine a baseline load for use in determining an overall energy shed.

For example, a large number of customers can be grouped based on quantitative features extracted from the received information. Hourly aggregates of received information can be used. Features used to sort customers into segments can include, for example, locations of structures (e.g., zip codes), usage, occupancy, morning on-times, structure sizes, structure types (e.g., residential or commercial) rated power of air conditioning unit(s), and/or ages of air conditioning units. In some embodiments, customers can be sorted into segments with similar HVAC usage patterns. Different features of the HVAC usage pattern can be used. For example, segmentation can be performed based on hourly on-time 1 to 2 hours before the start of a demand response event.

A control group of customers can be selected for each segment. In some embodiments, the control group can be selected from customers who are not participating (e.g., not active) in the demand response event. For each segment, an average baseline consumption of customers participating in the demand response event can be determined (e.g., estimated) as the average baseline consumption of customers in the control group of that segment. The total baseline consumption of the segment can be the determined average baseline per segment customer multiplied by the number of customers in the segment.

Customers can be sorted into segments based on a particular geographical region (e.g., New York City). Using received information of a control group during the demand response event can allow embodiments herein to not require weather data because the customers of any given segment are similarly situated geographically and thus should experience similar weather conditions.

Sorting the customers into segments can be performed using received information from the day of a demand response event. In some embodiments, sorting the customers into segments can be performed using received information during a particular period of time prior to the demand response event (e.g., from a few hours before the demand response event). Using up-to-date information can allow embodiments herein to increase the likelihood that customers would occupy and/or use their respective structures in a similar way during the period of sorting and during the demand response event itself. Accordingly, embodiments herein can determine an energy shed associated with the demand response event in a particular segment based on the total baseline energy consumption for the particular segment and an aggregated energy consumption resulting from the demand response event.

As previously discussed, embodiments of the present disclosure can use the received information to create a number of operating models for a given customer. In some embodiments, such models can be used to assess which demand response program(s) are appropriate for a given customer and/or are likely to bring the most value to the utility. In some embodiments, such models can be used to identify customers who may benefit the most from an energy audit.

In some embodiments, received information can be sorted into three portions: a first portion including periods of steady-state operation (e.g., when the system is cycling on/off regularly), a second portion including periods of response to temperature setpoint changes (e.g., fully on or fully off during demand response events and/or changing temperature in response to a setpoint change), and a third portion including periods of transition between the periods of steady state operation and the periods of response to temperature setpoint changes (e.g., a shift between the fully on/fully off response to setpoint change and steady-state cycling).

For each of these three portions, a respective model can be created. A steady-state model can be created based on the first portion, a setpoint-change model can be created based on the second portion, and a transition model can be created based on the third portion.

Figure 2A:
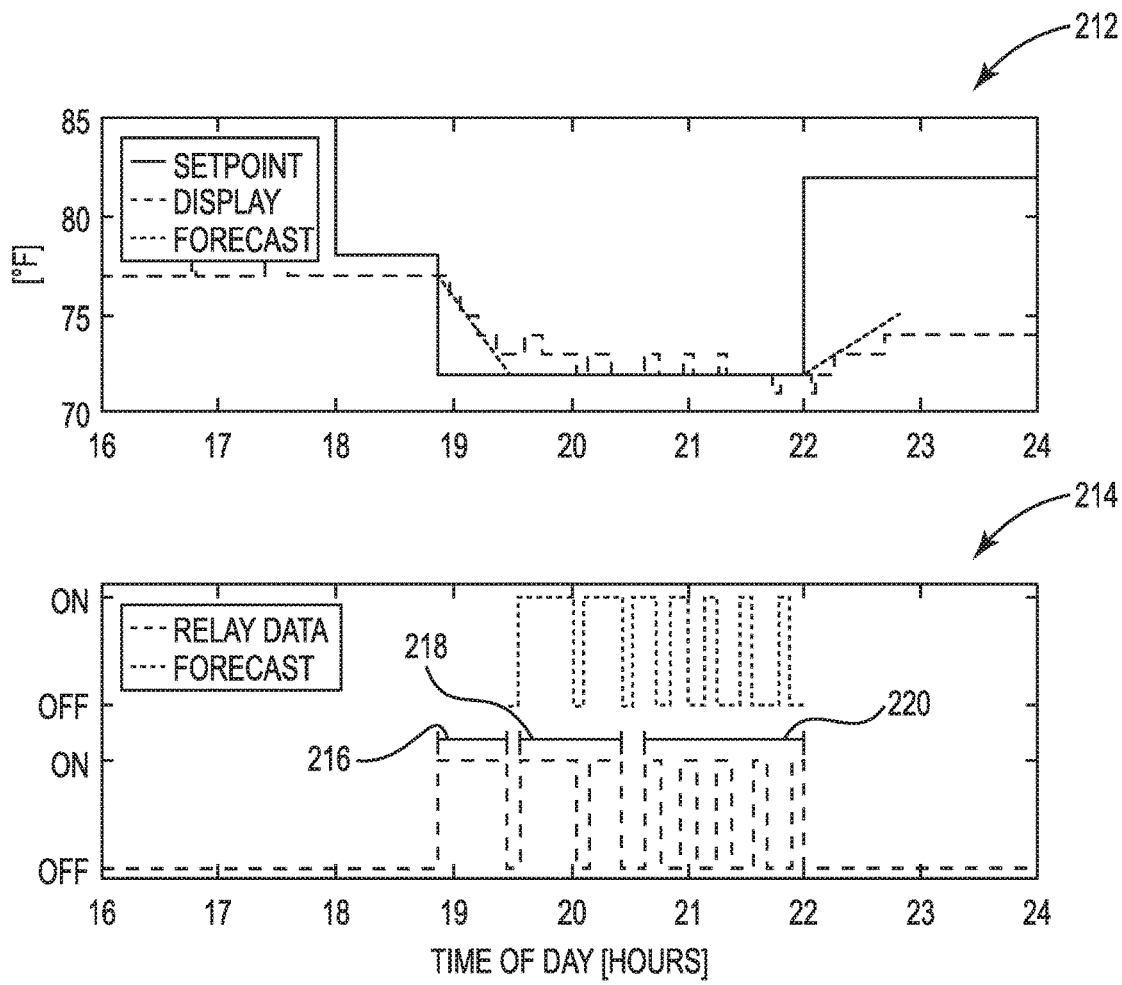
FIG. 2A illustrates graphs associated with determining models in accordance with one or more embodiments of the present disclosure.

FIG. 2A illustrates graphs associated with determining models in accordance with one or more embodiments of the present disclosure. Graph and 214 illustrate thermostat data associated with a particular thermostat in a structure over a period of time. As shown, the period of time beings around 16:00 and ends around 24:00, though it is noted that such period is illustrated for example purposes and embodiments herein are not so limited.

The graph 212 illustrates setpoint temperature, display temperature (e.g., actual and/or measured temperature) and forecast temperature associated with the thermostat. The graph 214 illustrates a control signal which shows on-time and off-time of an air conditioning unit associated with the thermostat. As shown in graph 212, the setpoint changes to a lower temperature just before 19:00. Accordingly, as shown in graph 214, the unit activates for a period of time (e.g., approximately one half hour) in order to bring the structure towards the setpoint.

Between the time that the air conditioning unit enters the on-state just before 19:00 and when it ultimately enters the off-state at 22:00, the temperature data can be sorted in three portions. A first portion 216 corresponds to a portion of the thermostat data associated with a period of response to the temperature setpoint change (e.g., the air conditioning unit being activated to bring the structure to the desired temperature). A third portion 220 corresponds to a portion of the thermostat data associated with steady-state operations (e.g., regular cycling) of the air conditioning unit after the setpoint has been reached and the air condition unit regularly cycles on/off to continue to provide the desired temperature. A second portion 218 falls between the first portion 216 and third portion 220 and represents a shift from the fully on or off (on, in this example) response to setpoint change and steady-state cycling.

Embodiments of the present disclosure can determine models associated with these portions of the thermostat data. For instance, embodiments herein can create a steady-state model, a setpoint-change model, and a transition model. The steady-state model can be an average on-time of the air conditioning unit during steady-state operation. The steady-state model can be conditioned by a number of factors, such as setpoint, temperature outside the structure, humidity, sunlight data (e.g., solar radiation), time of day, day of week, day of year, and/or occupancy, for example, among others. In some embodiments, the steady-state model can be described as a static function of temperature setpoint and available weather and/or calendar variables.

Setpoint changes can result from a user manually adjusting a setpoint. Setpoint changes can result from an automatically-scheduled setpoint change. Setpoint changes can result from a demand response event. The setpoint-change model can be a rate of temperature change in response to the air conditioning system going on or off as a static function of the measured inside air temperature and other variables (e.g., setpoint, temperature outside the structure, humidity, sunlight data, time of day, day of week, day of year, occupancy, etc.). In some embodiments, the set-point change model can be a line fitted to the rate of air temperature change inside the structure. As shown in the graph 212 the forecast line fit to the display temperature has a downward slope for the approximate half hour that the air conditioning unit is first activated. Such a fit may be a linear fit, though embodiments of the present disclosure are not so limited. The setpoint change model can describe the rate at which the structure cools down after the unit is activated. The setpoint change model can describe the rate at which the structure heats up after the unit is deactivated.

The transition model can capture the shift from the fully on/fully off response to setpoint change to the steady-state cycling of the air conditioning unit. In some embodiments, the transition model can be determined based on a look-up table.

Figure 2B:
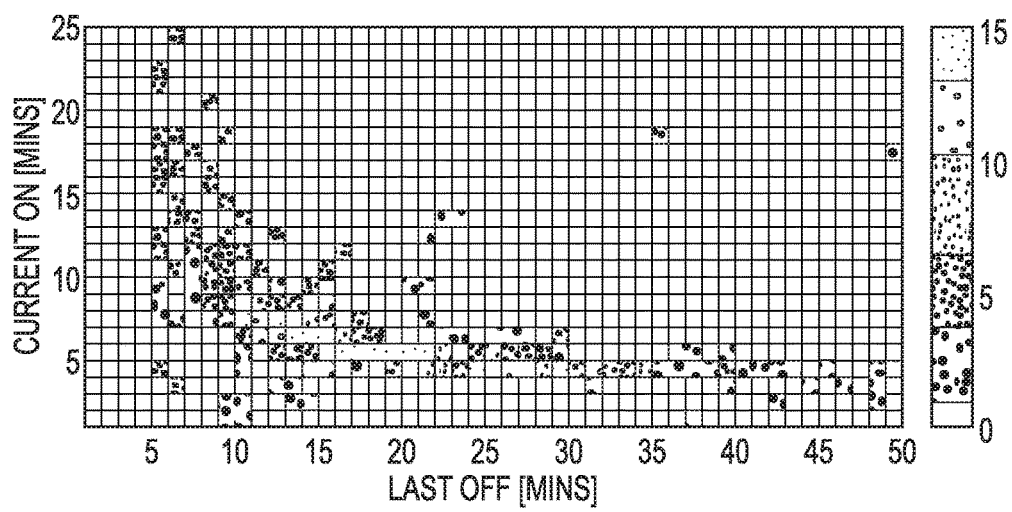
FIG. 2B illustrates a table associated with a transition model in accordance with one or more embodiments of the present disclosure.

FIG. 2B illustrates a table associated with a transition model in accordance with one or more embodiments of the present disclosure. The table 222 can be a look-up table, for instance. The data included in the table 222 can be determined based upon the factors listed previously (e.g., setpoint, temperature outside the structure, humidity, sunlight data, time of day, day of week, day of year, occupancy, etc.). Although one table 222 is shown in FIG. 2B, a plurality of look-up tables can be used to determine the transition model. Such look-up tables can represent probability density functions for the length of the current on-time given the previous off-time (and vice versa). For instance, as shown in the example illustrated in FIG. 2B, the table 222 shows a probability density function for the length of the current on-time of the air conditioning unit based on a previous off-time. Look-up tables in accordance with embodiments herein can be created for each thermostat (or structure) based on historical usage data.

Figure 3:
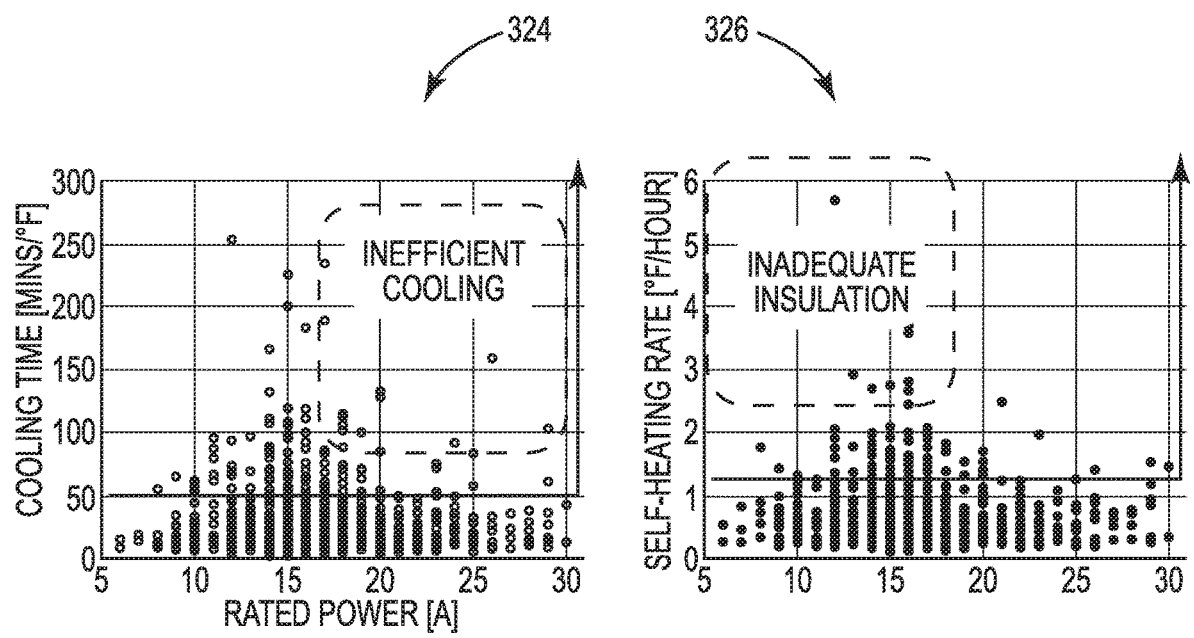
FIG. 3 illustrates a graph associated with cooling times of structures and a graph associated with self-heating times of structures in accordance with one or more embodiments of the present disclosure.

In some embodiments, the setpoint-change model can be used to determine a cooling rate associated with the structure and/or a self-heating rate associated with the structure. These rates can respectively be described as the rate at which the structure cools during on-times and the rate at which the structure heats during off-times. FIG. 3 illustrates a graph associated with cooling times of structures and a graph associated with self-heating times of structures in accordance with one or more embodiments of the present disclosure.

As previously discussed, embodiments herein can be used to determine inefficiencies and/or inadequacies associated with individual customers' systems. In some cases, for instance, a customer may suffer from inefficient cooling (e.g., an underpowered and/or malfunctioning air conditioning system). In some cases, a customer's structure may heat up too fast when the air conditioning system is cycled off (e.g., due to inadequate insulation or sun exposure). These problems may be associated with equipment issues, structural inadequacies, and/or customer behavior (e.g., leaving windows open).

From their individual thermostat data, customers can be segmented into groups such that similarly-situated customers can be compared and insight can be gained. The graph 324 illustrates the cooling times of a plurality of structures sorted by their respective air conditioning systems' rated power in Amps (e.g., from information associated with their individual air conditioning systems). Structures having a setpoint change model exceeding a cooling threshold (e.g., a cooling time exceeding the 90th percentile) may be experiencing inefficient cooling. Such customers may benefit from a check of their air conditioning system. Embodiments of the present disclosure can offer such a check responsive to the determination that the model exceeds the threshold.

The graph 326 illustrates the self-heating times (e.g., rates) of a plurality of structures sorted by their respective air conditioning systems' rated power in Amps. Structures having a setpoint change model exceeding a self-heating threshold (e.g., having a self-heating time exceeding the 90th percentile) may be inadequately insulated. Such customers may benefit from an energy audit of the structure. Embodiments of the present disclosure can offer such an audit responsive to the determination that the model exceeds the threshold. In some embodiments, a recommendation associated with a change in customer behavior can be provided (e.g., a recommendation to close blinds and/or close windows).

The setpoint-change model can be used to segment customers based on rated power, as shown in FIG. 3. It is noted, however, that other segmentation factors may be used to compare customers. For example, segmentation can be based on cooling time, self-heating rate, opt-out statistics, average on-time, demand response statistics, etc.

Figure 4:
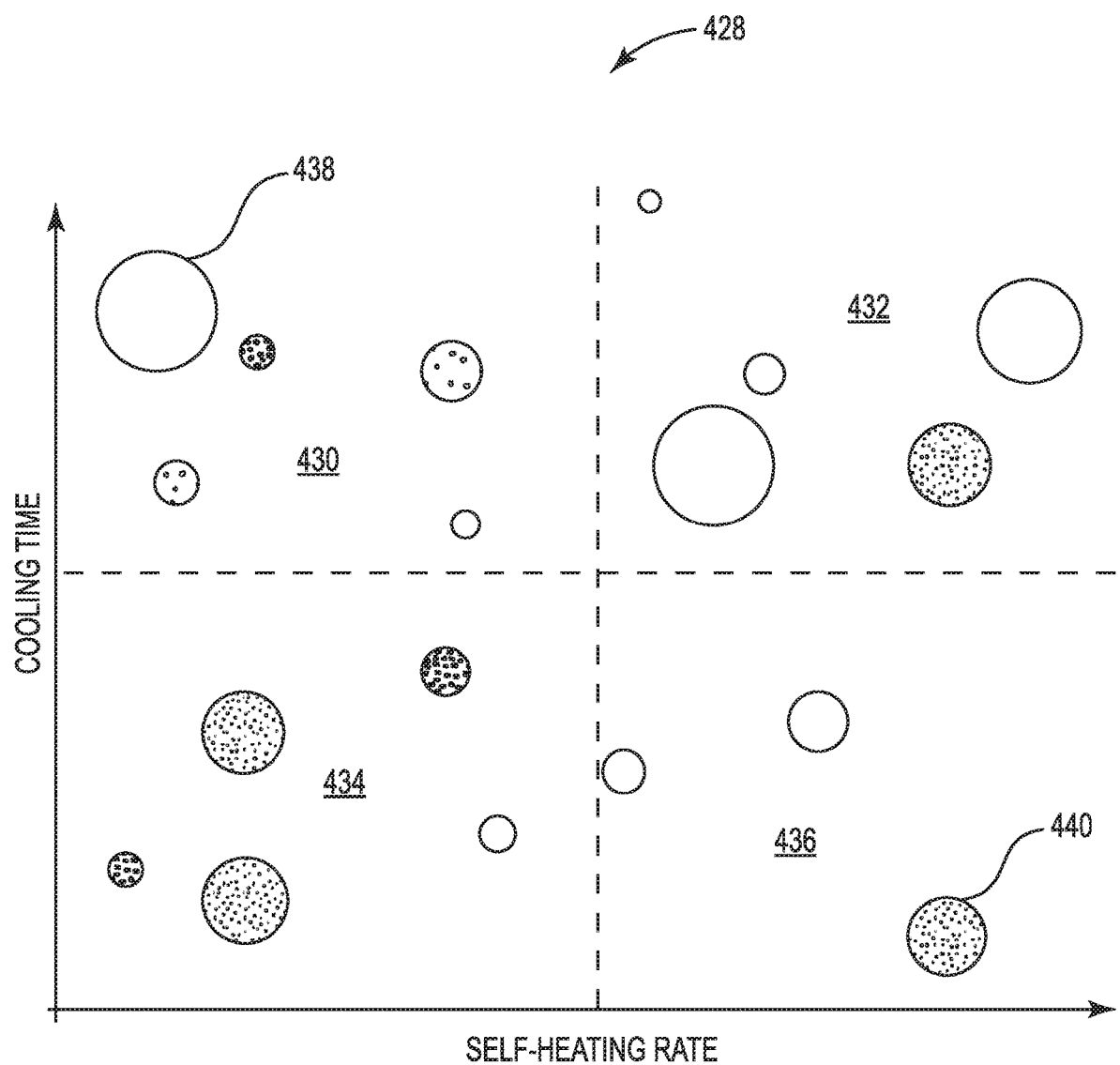
FIG. 4 illustrates a graph of structures segmented based on cooling time and self-heating rate in accordance with one or more embodiments of the present disclosure.

FIG. 4 illustrates a graph of structures segmented based on cooling time and self-heating rate in accordance with one or more embodiments of the present disclosure. The graph 428 includes a plurality of structures, each represented by a bubble. According to the legend associated with the graph 428, bubble color indicates opt-out rates from demand response events (lighter colors indicate lower opt-out rates, darker colors indicate higher opt-out rates), and bubble size indicates rated power of customers' HVAC systems (smaller size indicates lower power, larger size indicates higher power).

The graph 428 can generally be separated into 4 portions. A first portion 430 includes structures with relatively high cooling times and relatively low self-heating rates. A second portion 432 includes structures with relatively high cooling times and relatively high self-heating rates. A third portion 434 includes structures with relatively low cooling times and relatively low self-heating rates. A fourth portion 436 includes structures with relatively low cooling times and relatively high self-heating times.

The graph 428 can allow embodiments herein to make a number of determinations. For instance, the structure 438 may be determined to suffer from inefficient cooling as it takes relatively long for the structure 438 to cool despite a high-powered air conditioning system and relatively low self-heating rate. The structure 440 may benefit from improved insulation as the structure 440 self-heats relatively fast despite its efficient cooling (indicated by its relatively low cooling time). In some cases, the structure 440 may benefit from customer behavior change (e.g., closing windows).

The graph 428 can allow the determination of demand response programs that may be the most beneficial to particular customers or to utilities. Demand response programs can include a duty-cycle program (e.g., direct load control), an offset program and/or a precooling program, for instance. A duty-cycle program can include the deactivation of cooling for a particular period of time during an event. An offset program can include a modification of a thermostat setpoint (e.g., an increase in setpoint temperature) during an event. A precooling program can include a modification of a thermostat setpoint before an event occurs (e.g., a reduction of a setpoint temperature for a period of time preceding an event to cool the house down). During an event, a structure utilizing a precooling program may have normal setpoint values (e.g., values not modified from normal due to the event).

Structures in the second portion 432 may benefit the most from a duty-cycle program as these structures consume a relatively large amount of energy and therefore represent a relatively large amount of load to shed. Accordingly, embodiments herein can include recommending the duty-cycle program responsive to a determination that the self-heating rate is above a self-heating threshold and the cooling rate is below a cooling threshold (e.g., the structure takes a relatively long time to cool).

Structures in the third portion 434 may benefit the most from an offset program as these structures warm relatively slowly and can be relatively easily cooled down. Accordingly, embodiments herein can include recommending the offset program responsive to a determination that the self-heating rate is below the self-heating threshold and the cooling rate is above the cooling threshold.

For similar reasons, structures in the third portion 434 may benefit from the precooling program as these structures warm relatively slowly and can be relatively easily cooled down. In some embodiments, both the offset program and the precooling program can be offered as options. In some embodiments, a utility can determine which of these programs to offer and/or apply.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A non-transitory computer-readable medium having instructions stored thereon which, when executed by a processor, cause the processor to:
   receive thermostat data associated with an operating thermostat of a heating, ventilation, and air conditioning (HVAC) system in a structure over a period of time including measured temperatures inside the structure and conditions external to the structure;
   determine a first portion of the thermostat data corresponding to steady-state operation periods of the thermostat;
   determine a second portion of the thermostat data corresponding to operation periods of the thermostat that are responding to temperature setpoint changes;
   determine a third portion of the thermostat data corresponding to operation periods of the thermostat that are transitions between the steady-state operation periods and the operation periods that are responding to temperature setpoint changes; and
   create a steady-state model of the thermostat based on the first portion of the thermostat data, a setpoint-change model of the thermostat based on the second portion of the thermostat data, and a transition model of the thermostat based on the third portion of the thermostat data, wherein the setpoint change-model of the thermostat includes:
   a rate of temperature change of the structure in response to the HVAC system
   activating or deactivating as a static function of the measured temperatures inside the structure and the conditions external to the structure.

2. The medium of claim 1, wherein the thermostat data includes:
   setpoints of the thermostat;
   signals associated with HVAC devices of the structure;
   demand response signals received by the thermostat;
   contextual information associated with the HVAC devices and the structure; and
   conditions external to the structure.

3. The medium of claim 2, wherein the steady-state model of the thermostat includes an average on-time of the thermostat as a static function of the setpoints of the thermostat and the conditions external to the structure.

4. The medium of claim 2, wherein the transition model of the thermostat includes:
   a probability density function associated with a length of an on-time of the thermostat based on a length of a previous off-time of the thermostat and the conditions external to the structure; and a probability density function associated with a length of an off-time of the thermostat based on a length of a previous on-time of the thermostat and the conditions external to the structure.

5. The medium of claim 1, including instructions to determine a cooling inefficiency associated with the HVAC system based on a determination that the setpoint-change model exceeds a cooling threshold.

6. The medium of claim 1, including instructions to determine an insulation inefficiency associated with the structure responsive to a determination that the setpoint-change model of the thermostat meets or exceeds a self-heating threshold.

7. The medium of claim 1, including instructions to provide a recommendation associated with a change in customer behavior responsive to a determination that the setpoint-change model of the thermostat meets or exceeds a self-heating threshold.

8. A computing device for providing demand response, comprising:
   a processor; and
   a memory configured to store instructions which, when executed by the processor, cause the processor to:
   receive thermostat data associated with each of a plurality of sites over a period of time, wherein each respective site includes an operating thermostat of a heating, ventilation, and air conditioning (HVAC) system in a structure;
   determine an HVAC usage pattern for each of the plurality of sites;
   receive contextual information associated with each of the plurality of sites;
   sort the plurality of sites into a plurality of segments based on the HVAC usage pattern and the contextual information; and
   for each segment:
   determine a control group of sites; and
   determine a total baseline energy consumption of sites of the segment active in a demand response event based on an average baseline energy consumption of sites of the control group and a quantity of sites in the segment.

9. The computing device of claim 8, wherein the instructions to determine the HVAC usage pattern include instructions to determine the HVAC usage patterns on a same day as the demand response event.

10. The computing device of claim 8, wherein each segment includes a plurality of sites in a respective geographical region.

11. The computing device of claim 8, including instructions to determine the control group of sites from a plurality of sites not participating in the demand response event.

12. The computing device of claim 8, wherein the contextual information for each site includes:
   a rated power of each of a plurality of devices of the HVAC system;
   a location of the structure;
   a size of the structure;
   a type of the structure; and
   an age of the HVAC system.

13. The computing device of claim 8, including instructions to determine an energy shed associated with the demand response event in a particular segment based on the total baseline energy consumption for the particular segment and an aggregated energy consumption resulting from the demand response event.

14. The computing device of claim 8, wherein the HVAC usage pattern for each of the plurality of sites includes an on-time for the HVAC system of each of the plurality of sites during a particular period of time prior to the demand response event.

15. A method for providing demand response, comprising:
   receiving thermostat data associated with an operating thermostat of a heating, ventilation, and air conditioning (HVAC) system in a structure over a period of time;
   determine a cooling rate associated with the structure based on the thermostat data;
   determine a self-heating rate associated with the structure based on the thermostat data; and
   recommend a demand response program type to apply to the HVAC system based on the cooling rate and the self-heating rate,
   wherein the method includes recommending the duty-cycle program to apply to the HVAC system responsive to a determination that the self-heating rate is above a self-heating threshold and the cooling rate is below a cooling threshold.

16. The method of claim 15, wherein the demand response program type is selected from a group of demand response program types including:
   a duty-cycle program;
   an offset program; and
   a precooling program.

17. The method of claim 16, wherein the method includes recommending the offset program to apply to the HVAC system responsive to a determination that the self-heating rate is below the self-heating threshold and the cooling rate is above the cooling threshold.

18. The method of claim 17, wherein the method includes recommending the precooling to apply to the HVAC system responsive to a determination that the self-heating rate is below the self-heating threshold and the cooling rate is above the cooling threshold.

* * * * *